United States Patent Office 3,578,663
Patented May 11, 1971

3,578,663
PREPARATION OF CYANURIC CHLORIDE
Wilhelm Gruber and Wolfgang Kleine-Doepke, Darmstadt, Germany, assignors to Rohm & Haas G.m.b.H., Darmstadt, Germany
No Drawing. Filed Dec. 3, 1968, Ser. No. 780,911
Claims priority, application Germany, Dec. 15, 1967,
P 16 95 658.4
Int. Cl. C07d 55/42
U.S. Cl. 260—248       3 Claims

ABSTRACT OF THE DISCLOSURE

The yield of cyanuric chloride is increased and the life of an activated charcoal catalyst used in preparing cyanuric chloride by contact of cyanogen and chlorine in the gas phase at a temperature of from about 350° C. to about 750° C. is considerably lengthened by pretreatment of the activated charcoal catalyst for removal therefrom of metal compounds, preferably with a metal-solubilizing acid such as aqueous hydrochloric acid, formic acid, acetic acid or dilute nitric acid.

---

This invention relates to an improved process for the preparation of cyanuric chloride.

Cyanuric chloride, or 2,4,6-trichloro-1,3,5-triazine,

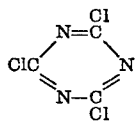

is a material useful in preparing numerous other substances. For example, dyestuffs and dyestuff intermediates can be made by condensation of this reagent with aminonaphthols or amino-azo compounds. The substituted triazines obtained by substitution reactions of cyanuric chloride with phenols, amines, and alcohols can be polymerized with materials such as formaldehyde to form synthetic resins. In the textile industry the reaction products of cyanuric chloride and ethylene imine are used as water proofing agents. Cyanuric chloride is also used as a starting material in the preparation of a number of bactericidal and therapeutically active compounds, as well as in the preparation of several sulfur-containing vulcanisation accelerators and of so-called "optical whiteners." The same compound can be used to prepare esters of cyanuric acid, which, in turn, are useful as plasticizers and wetting agents.

It is known that cyanuric chloride can be prepared by trimerization of cyanogen chloride and also, as described in U.S. Pat. 3,093,642, by contacting chlorine and cyanogen in the gas phase with an activated charcoal catalyst at a temperature in the range from about 350° C. to about 750° C. It has also been proposed to improve the latter process by utilizing chlorine in a molar stoichiometric excess of between 0.05 to 0.4 mole per mole of cyanogen. Finally, it is known that maximum yields of cyanuric chloride are obtainable by the use of highly activated charcoal of the type used for gas adsorption, for example, the type of charcoal used in filling gas masks, and that water should be removed as far as possible from such activated charcoal before it is used as a catalyst in the preparation of cyanuric chloride.

The use of a stoichiometric excess of chlorine in the reaction has had the beneficial effect of extending the useful life of the activated charcoal catalyst, which otherwise had to be regenerated after 10 to 20 hours of operation by heating to temperatures of the order of 800 to 1,000° C. A 10 percent stoichiometric excess of chlorine was found to lengthen the life of the catalyst approximately ten-fold, whereafter the activity of the charcoal became sharply reduced. A furher increase in the stoichiometric excess of chlorine to, for example, 20 percent, further lengthens the life of the catalyst. However, even such an increase in the amount of chlorine does not lengthen the life of the catalyst beyond approximately 300 hours, thereupon again requiring heating to 800° C. to 1,000° C. or treatment at 400° C. with superheated steam for regeneration.

It has now been found that the yield of cyanuric chloride and also the useful life of the catalyst can be appreciably increased by a pretreatment of the activated charcoal catalyst, before it is used in reacting cyanogen with chlorine, to remove from the charcoal substantially all of its content of metals. This is most expeditiously accomplished by treatment with an aqueous acid capable of dissolving the metals or metal compounds inherently present in the activated charcoal. The acid found most useful for this purpose is aqueous hydrochloric acid. Other acids useful in this pretreatment include formic, acetic and dilute nitric acids. Most advantageously, the activated charcoal is treated first with an aqueous hydrochloric acid of approximately 20 percent strength and then washed with water.

The time of treatment of the activated charcoal with acid depends to a large extent on the manner in which the activated charcoal was prepared. If it was prepared from wood which had been treated with a metal salt solution such as a solution of zinc chloride, the time of treatment with acid is necessarily somewhat longer than with charcoal activated by treatment with superheated steam. It is generally necessary to subject charcoal to the action of an aqueous acid for more than a day. By way of example, a charcoal activated with steam was found to have its ash content of 6.2 percent reduced to 0.4 percent after a five day treatment with 20 percent aqueous hydrochloric acid followed by washing with water. It is to be understood, of course, that pretreatment of the charcoal should not be undertaken with acids that would form salts that are insoluble or difficultly soluble in water with the cations normally present in the charcoal.

The utility and advantages of the process of this invention will become more apparent from the following examples.

EXAMPLE 1

0.322 mole of cyanogen per hour and 0.354 mole of chlorine per hour (a 10 mole percent stoichiometric excess of chlorine) were passed continuously through a 700 mm. layer of finely divided charcoal activated with superheated steam contained in a vertical and externally heated quartz tube having an internal diameter of 24 mm. and a length of one meter. The temperature in the tube was maintained at between 410 and 430° C. The cyanuric chloride was separated from the gases leaving the reaction tube at intervals and weighed to determine the yield.

EXAMPLE 2

The procedure described in Example 1 was repeated, the activated charcoal catalyst, however, having been pretreated for five days with a 20 percent aqueous hydrochloric acid solution followed by washing for eight hours with water free of electrolytes, predrying of the charcoal and final drying thereof in the reaction tube at 400° C. before beginning of the reaction.

EXAMPLE 3

The procedure of Example 1 was repeated with the exception that the rate of feed of chlorine was increased to 0.386 mole per hour, i.e., 120 percent of the stoichiometric amount.

EXAMPLE 4

The procedure described in Example 3 was repeated with charcoal catalyst pretreated as described in Example 2.

The results obtained by the operation described in Examples 1, 2, 3 and 4 are set forth in the table immediately below:

TABLE

[Yield of cyanuric chloride, in percent of theoretical, after number of hours of operation indicated in Column 1]

| Hours of operation | Example 1 | Example 2 | Example 3 | Example 4 |
|---|---|---|---|---|
| 1 | 95 | 98 | 96 | 97 |
| 5 | 95 | 97 | 96 | 99 |
| 10 | 95 | 97 | 95 | 98 |
| 15 | 94 | 98 | 95 | 100 |
| 20 | 96 | 98 | 96 | 98 |
| 50 | 96 | 97 | 94 | 99 |
| 80 | 95 | 96 | 95 | 98 |
| 100 | 94 | 96 | 94 | 98 |
| 150 | 94 | 97 | 95 | 97 |
| 200 | 93 | 97 | 93 | 98 |
| 250 | 85 | 95 | 92 | 99 |
| 300 | 70 | 96 | 90 | 97 |
| 700 | (¹) | 94 | 85 | 96 |

¹ Discontinued.

It is apparent from the data in the foregoing table that the yield of cyanuric chloride falls off rapidly after 250 and 300 hours of operation when the stoichiometric excess of chlorine is 10 and 20 percent respectively and the activated charcoal is not pretreated to remove the metal compounds inherently therein, whereas the yield of cyanuric chloride is increased and the useful life of the catalyst is increased to at least 700 hours and possibly considerably more by pretreatment of the catalyst with aqueous hydrochloric acid.

We Claim:

1. A process for preparing cyanuric chloride by contacting cyanogen and chlorine in the gas phase with an activated charcoal catalyst at a temperature of from about 350° C. to about 750° C. wherein the activated charcoal has been pretreated with aqueous hydrochloric acid to remove metal compounds therefrom substantially completely.

2. Process as defined in claim 1 wherein a stoichiometric excess of chlorine is brought into contact with the cyanogen.

3. Process as defined in claim 1 wherein the activated charcoal was washed with water after pretreatment.

References Cited

UNITED STATES PATENTS

| | | | |
|---|---|---|---|
| 2,753,346 | 7/1956 | Huemer | 260—248 |
| 2,762,798 | 9/1956 | Hardwicke et al. | 260—248 |
| 3,093,642 | 6/1963 | Zima | 260—248 |

JOHN M. FORD, Primary Examiner